US012652699B2

(12) United States Patent
Cariou et al.

(10) Patent No.: US 12,652,699 B2
(45) Date of Patent: Jun. 9, 2026

(54) MECHANISM TO ENABLE ALIGNED CHANNEL ACCESS

(71) Applicant: Intel Corporation, Santa Clara, CA (US)

(72) Inventors: Laurent Cariou, Milizac (FR); Dibakar Das, Hillsboro, OR (US); Dmitry Akhmetov, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/401,353

(22) Filed: Dec. 30, 2023

(65) Prior Publication Data

US 2024/0137984 A1 Apr. 25, 2024

Related U.S. Application Data

(63) Continuation of application No. 17/242,865, filed on Apr. 28, 2021, now abandoned.

(60) Provisional application No. 63/016,847, filed on Apr. 28, 2020.

(51) Int. Cl.
*H04W 74/0816* (2024.01)
*H04W 74/00* (2009.01)
*H04W 74/08* (2024.01)

(52) U.S. Cl.
CPC ..... *H04W 74/0816* (2013.01); *H04W 74/002* (2013.01); *H04W 74/0891* (2013.01)

(58) Field of Classification Search
CPC ........... H04W 74/002; H04W 74/0816; H04W 74/0891; H04W 84/12
See application file for complete search history.

(56) References Cited

U.S. PATENT DOCUMENTS

| 11,612,002 B2 * | 3/2023 | Seok | H04W 80/02 |
|---|---|---|---|
| 12,082,242 B2 * | 9/2024 | Jang | H04W 76/15 |
| 2016/0165637 A1 * | 6/2016 | Kim | H04W 52/0229 370/329 |
| 2017/0339720 A1 * | 11/2017 | Kim | H04W 74/0808 |
| 2021/0076398 A1 * | 3/2021 | Naribole | H04W 74/0816 |
| 2021/0195540 A1 * | 6/2021 | Fischer | H04W 56/0005 |
| 2021/0266891 A1 * | 8/2021 | Chu | H04L 5/1469 |
| 2021/0282186 A1 * | 9/2021 | Cherian | H04W 74/0816 |
| 2021/0315025 A1 * | 10/2021 | Seok | H04W 74/0891 |

* cited by examiner

*Primary Examiner* — Liton Miah
(74) *Attorney, Agent, or Firm* — Gray Ice Higdon, PLLC

(57) ABSTRACT

This disclosure describes systems, methods, and devices related to aligned channel access. A device may perform a first backoff countdown on a first link associated with a first station device (STA) of the device, wherein the device is a multi-link device (MLD). The device may detect a second backoff countdown associated with a second STA of the MLD after the first backoff countdown reaches zero. The device may determine to hold the first backoff countdown at zero based on the value of the second backoff countdown. The device may transmit in synchronization on the first link and on the second link from the first STA and the second STA respectively based on holding the first backoff countdown at zero.

20 Claims, 11 Drawing Sheets

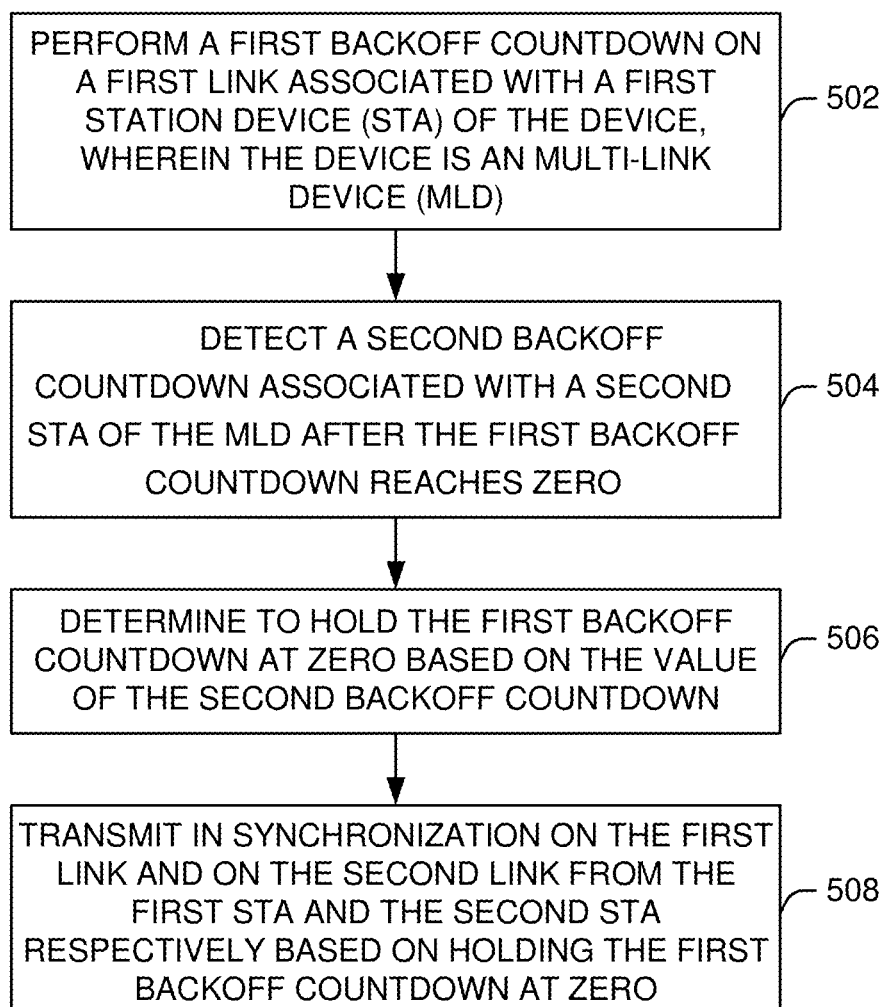

500

PERFORM A FIRST BACKOFF COUNTDOWN ON A FIRST LINK ASSOCIATED WITH A FIRST STATION DEVICE (STA) OF THE DEVICE, WHEREIN THE DEVICE IS AN MULTI-LINK DEVICE (MLD) ⌐ 502

DETECT A SECOND BACKOFF COUNTDOWN ASSOCIATED WITH A SECOND STA OF THE MLD AFTER THE FIRST BACKOFF COUNTDOWN REACHES ZERO ⌐ 504

DETERMINE TO HOLD THE FIRST BACKOFF COUNTDOWN AT ZERO BASED ON THE VALUE OF THE SECOND BACKOFF COUNTDOWN ⌐ 506

TRANSMIT IN SYNCHRONIZATION ON THE FIRST LINK AND ON THE SECOND LINK FROM THE FIRST STA AND THE SECOND STA RESPECTIVELY BASED ON HOLDING THE FIRST BACKOFF COUNTDOWN AT ZERO ⌐ 508

FIG. 5

MECHANISM TO ENABLE ALIGNED CHANNEL ACCESS

CROSS-REFERENCE TO RELATED PATENT APPLICATION(S)

This application is a continuation of U.S. Non-Provisional application Ser. No. 17/242,865, filed Apr. 28, 2021, which claims the benefit of U.S. Provisional Application No. 63/016,847, filed Apr. 28, 2020, the disclosures of which are incorporated herein by reference as if set forth in full.

TECHNICAL FIELD

This disclosure generally relates to systems and methods for wireless communications and, more particularly, to mechanism to enable aligned channel access.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 5 illustrates a flow diagram of illustrative process for an illustrative aligned channel access system, in accordance with one or more example embodiments of the present disclosure.

DETAILED DESCRIPTION

Figure 1:
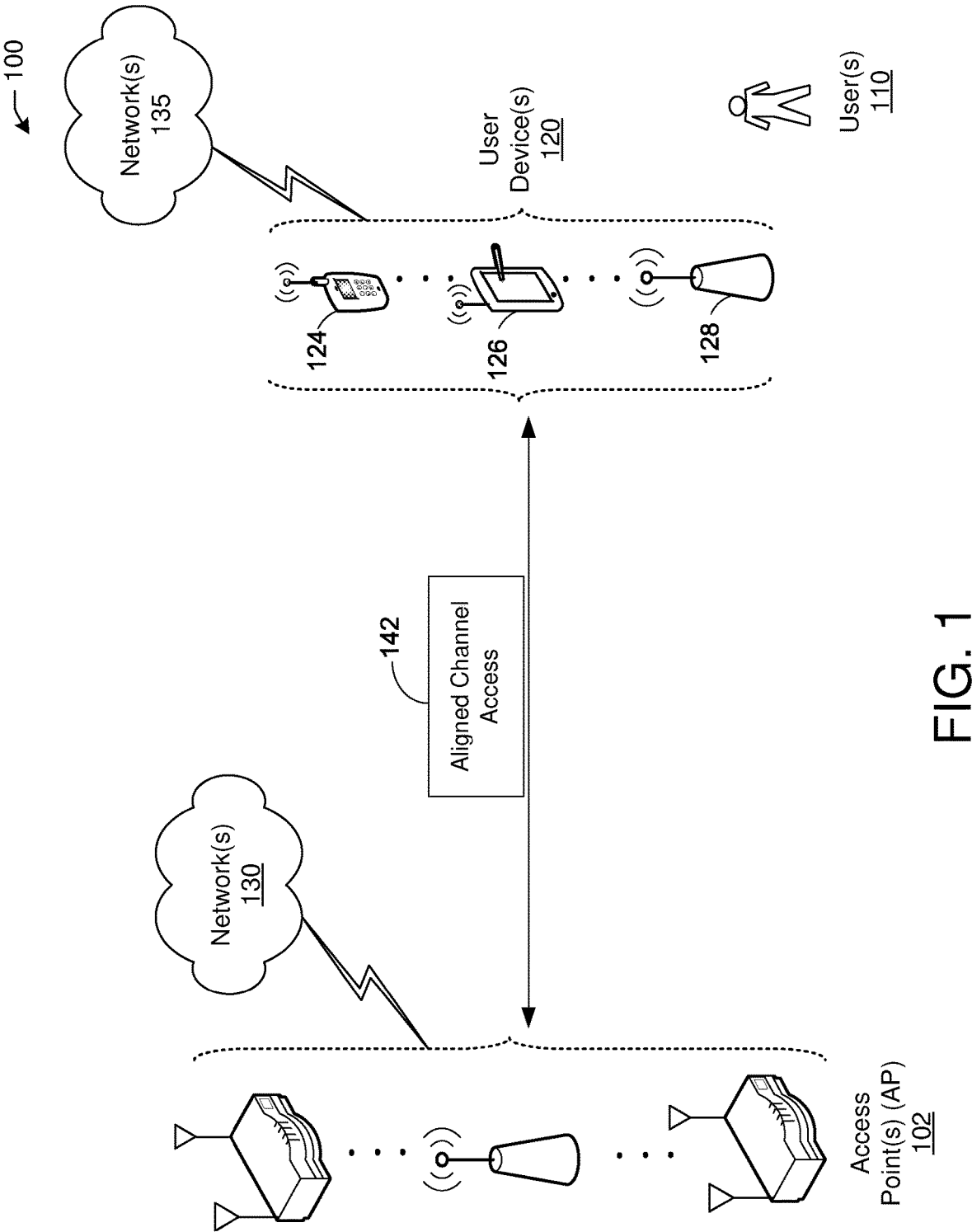
FIG. 1 is a network diagram illustrating an example network environment for aligned channel access, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Multi-link operation (MLO) is a key IEEE 802.11be ("11be") feature which allows a device to communicate to another device using multiple links on different channels/bands. A device supporting multiple links is called a multilink device (MLD). In general, some STA MLD may have high leakage which prevents it from simultaneously transmitting and receiving on different links. Such a device is called non-simultaneous transmit receive (STR) MLD and is typically expected to be a non-AP STA MLD. Note that such a device may not be able to utilize the benefits of multi-link in UL using EDCA based channel access. This occurs as whenever the STA is transmitting on link 1, the leakage may cause its other link to suspend EDCA.

In an MLD, there are multiple links that the MLD can transmit and receive data. For example, if an MLD comprises two Wi-Fi devices and cited (e.g., to STAs), one of these two STAs may transmit on 2.4 GHz and the other may transmit on 5 GHz simultaneously. In that scenario, when the first STA transmit on its link, energy of the transmission may leak into the length of the second STA. In that sense, if both are transmitting in a frequency band that is close to each other, this introduces interference in each other's links. One STA may think its link is busy due to that interference. In that case, that STA may not be able to contend for channel access in order to transmit its data. This could happen on the transmit or receive chain of the STA.

The most straight-forward way to solve this problem is to ensure that the transmissions from the STA MLD on the two links start at the same time. However, using the baseline EDCA mechanism the opportunities of the STA MLD having zero back-off count at the same time in both links is low.

In one or more embodiments, an aligned channel access system may address the problem of how to increase the probability of simultaneous transmission by a STA MLD.

One way to achieve this simultaneous transmission capability is through point coordination function inter-frame space (PIFS) access similar to the channel access for 80+80 type transmissions. Essentially, whenever a STA wins channel access in link 1 through baseline EDCA, it checks whether the STA in link 2 has detected the medium to be idle for PIFS. If it is, the STA can initiate a TXOP on both links simultaneously. Some variation of this idea has also been proposed, namely, The STA performs enhanced distributed channel access (EDCA) based channel access on one link and only PIFS based access in the other.

In addition to energy detect, the STA may also consider the network allocation vector (NAV) settings on the other link prior to PIFS based access.

After PIFS-based channel access a STA adds the remaining backoff counter value to the next backoff countdown.

The PIFS-based access proposals are unfair to other STAs on that channel as with respect to those STAs the EHT STA has chance to get more channel access.

Example embodiments of the present disclosure relate to systems, methods, and devices for a mechanism to enable aligned channel access for 11be specific multi-link operation (MLO).

In one or more embodiments, a aligned channel access system may facilitate synchronizing transmissions on multiple links within an MLD, such that each STA of the MLD transmits in synchronization with another STA on separate links. For example, if one of these STAs wins access to a channel to transmit on its link, that STA may not transmit right away but instead wait for the second STA's backoff countdown reaches zero—indicating that the second STA can now transmit on its link—so that both STAs can transmit simultaneously. In that case, one STA has to check the other STA's status before starting its own transmission. For example, one STA may determine that the other STA is performing a backoff countdown or it may determine how large is the backoff count down is and compare it to a threshold value before deciding to wait or go ahead and transmit. For example if the backoff countdown is too large, the first STA may still transmit without waiting for the second STA. However, if the first STA determines that the backoff countdown is below the threshold value, the first STA made then determined to wait until the second STA has countdown to zero so that they can both transmit simultaneously. It should be understood that each STA will have its own backoff countdown value that may be different from each other.

In one embodiment, a aligned channel access system may allow an STA MLD with small enough difference in backoff count-down values on two links to transmit only when both its constituent STAs have counted down to zero. Essentially, this means if a STA in the MLD counts down to zero earlier than the other STA, then it pauses its backoff count at that value instead of transmitting right away. In one or more embodiments, an aligned channel access system may also propose an alternative fix to the point coordination function IFS (PIFS)-based channel access that is fairer to other STAs in a given link.

An aligned channel access system may improve uplink (UL) throughput for the EHT STA without affecting fair channel access for the other STAs.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of aligned channel access, according to some example embodiments of the present disclosure. Wireless network 100 may include one or more user devices 120 and one or more access points(s) (AP) 102, which may communicate in accordance with IEEE 802.11 communication standards and which may be multi-link devices (MLDs). The user device(s) 120 may be mobile devices that are non-stationary (e.g., not having fixed locations) or may be stationary devices, which also may be multi-link devices (MLDs).

Figure 6:
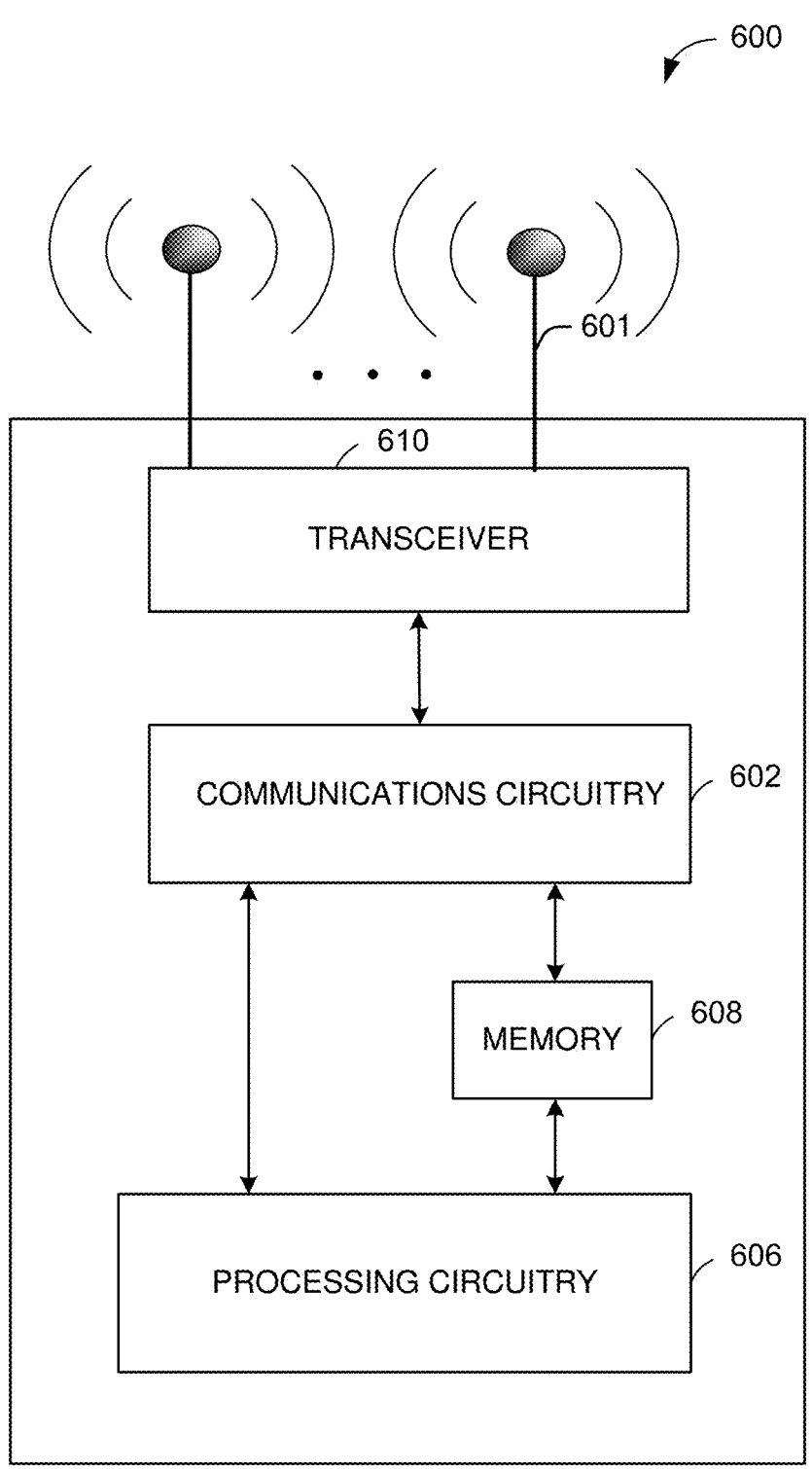
FIG. 6 illustrates a functional diagram of an exemplary communication station that may be suitable for use as a user device, in accordance with one or more example embodiments of the present disclosure.
Figure 7:
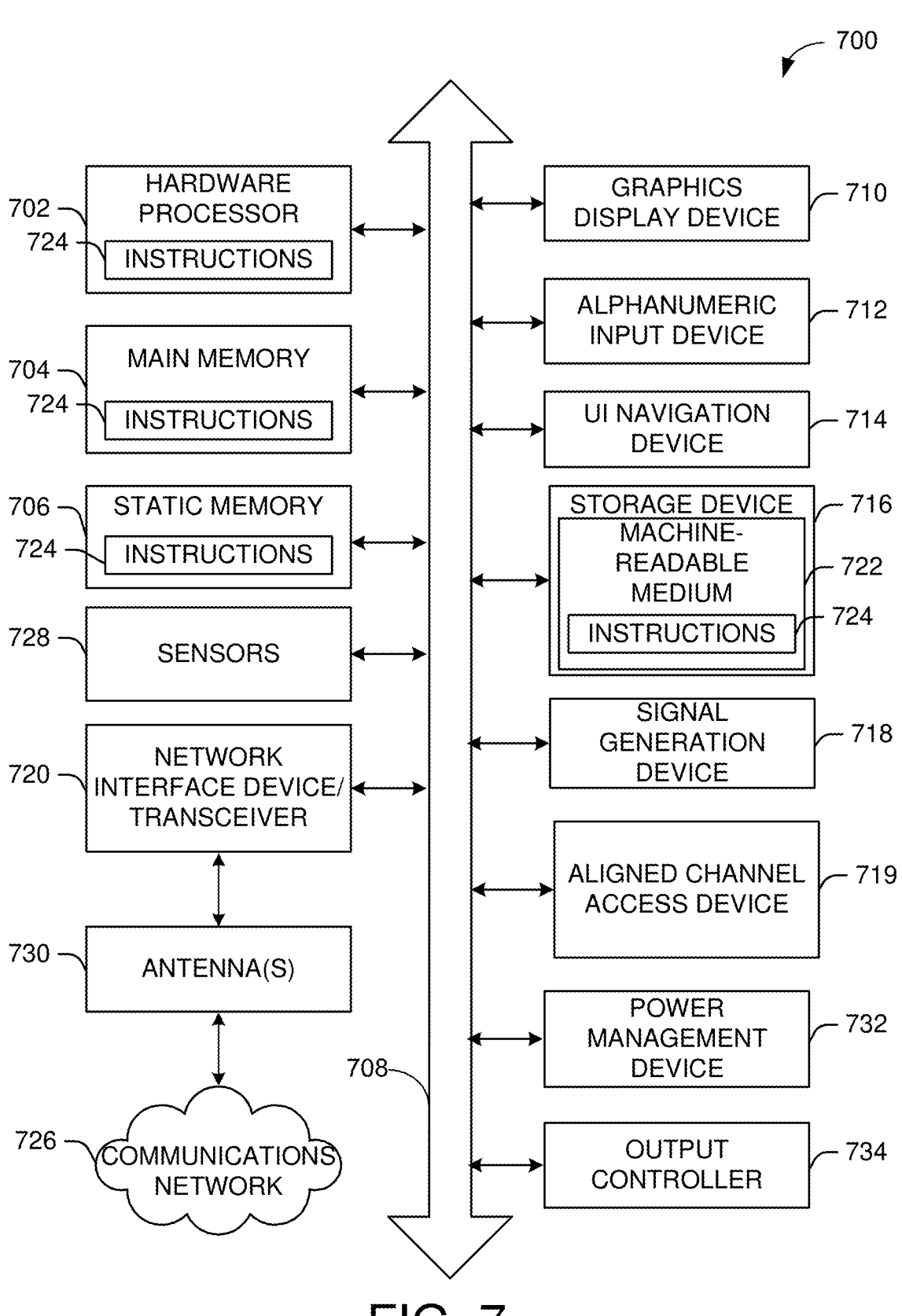
FIG. 7 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device (s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, micro-wave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate aligned channel access 142 with one or more user devices 120.

In one or more embodiments, the aligned channel access 142 may be a mechanism, in accordance with one or more example embodiments of the present disclosure that allows a plurality of STAs with an MLD to coordinate and synchronize their transmissions in order to minimize interference between links of the MLD.

It is understood that the above descriptions are for pur-poses of illustration and are not meant to be limiting.

Figure 2:
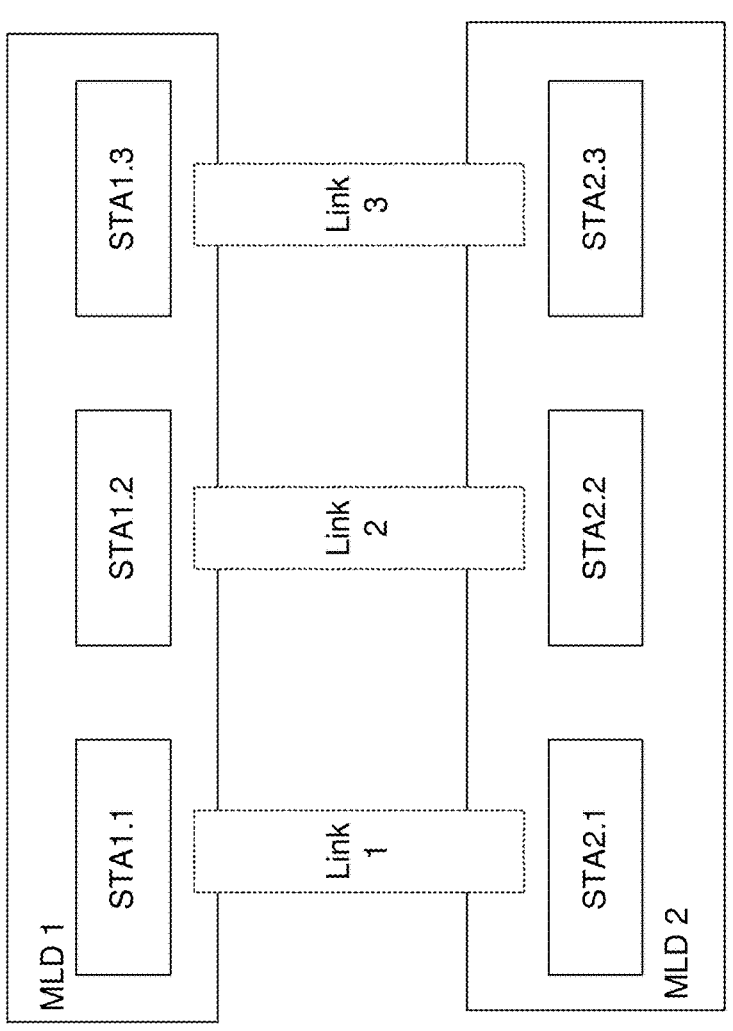
FIG. 2 depicts an illustrative schematic diagram for a multi-link device (MLD) between two logical entities, in accordance with one or more example embodiments of the present disclosure.

FIG. 2 depicts an illustrative schematic diagram for a multi-link device (MLD) between two logical entities, in accordance with one or more example embodiments of the present disclosure.

Referring to FIG. 2, there are shown two multi-link logical entities on either side which includes multiple STAs that can set up links with each other. A multi-link logical entity may be a logical entity that contains one or more STAs. The logical entity has one MAC data service interface and primitives to the logical link control (LLC) and a single address associated with the interface, which can be used to communicate on the distribution system medium (DSM). It should be noted that a Multi-link logical entity allows STAs within the multi-link logical entity to have the same MAC address. It should also be noted that the exact name can be changed.

In this example of FIG. 2, the multi-link logical entity 1 and multi-link logical entity 2 (MLD 2) may be two separate physical devices, where each one comprises a number of virtual or logical devices. For example, multi-link logical entity 1 may comprise three STAs, STA1.1, STA1.2, and STA1.3 and multi-link logical entity 2 that may comprise three STAs, STA2.1, STA2.2, and STA2.3. The example shows that logical device STA1.1 is communicating with logical device STA2.1 over link 1, that logical device STA1.2 is communicating with logical device STA2.2 over link 2, and that device STA1.3 is communicating with logical device STA2.3 over link 3.

Figure 3:
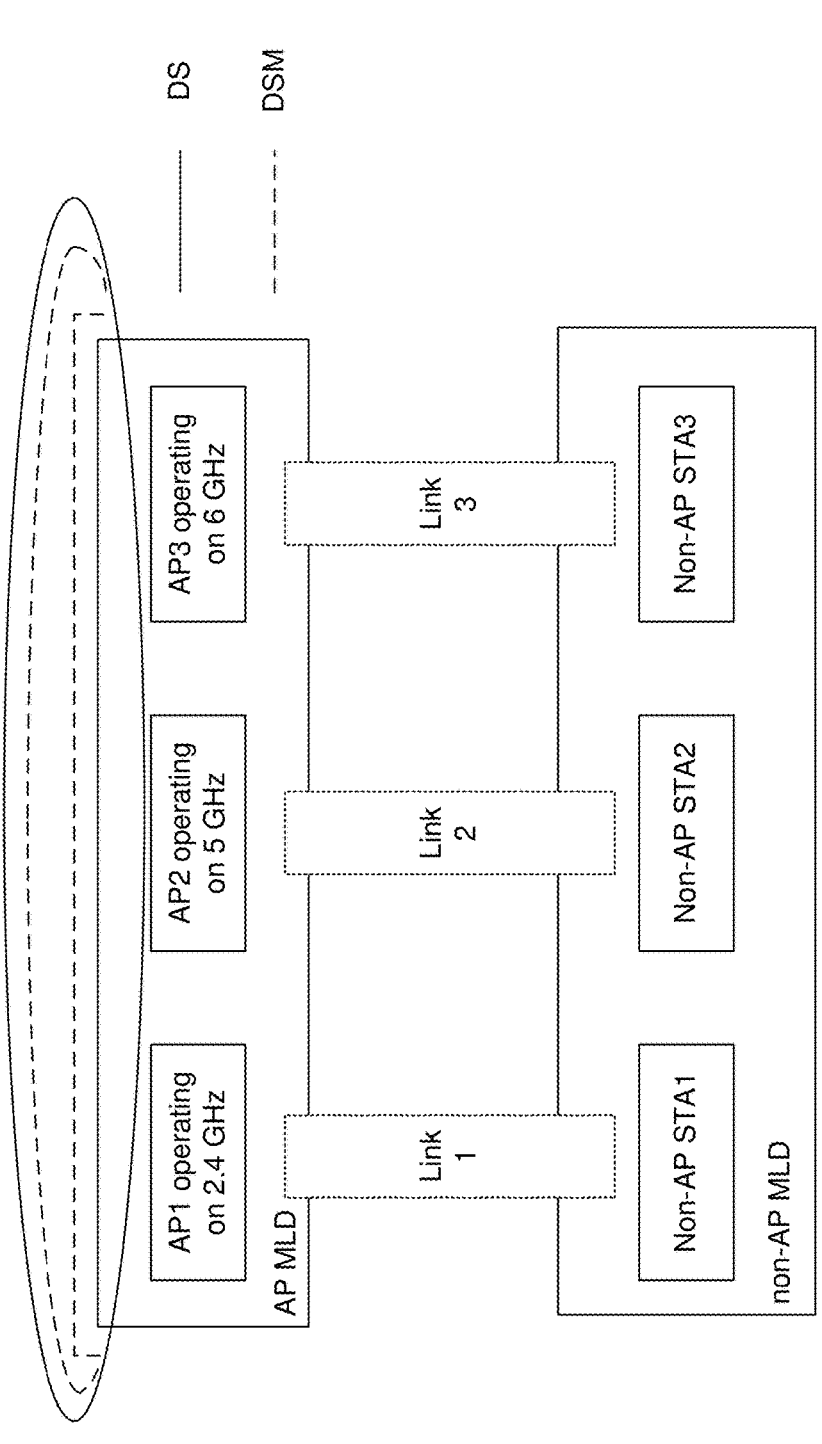
FIG. 3 depicts an illustrative schematic diagram for a multi-link device (MLD) between AP with logical entities and a non-AP with logical entities, in accordance with one or more example embodiments of the present disclosure.

FIG. 3 depicts an illustrative schematic diagram for a multi-link device (MLD) between AP with logical entities and a non-AP with logical entities, in accordance with one or more example embodiments of the present disclosure.

Referring to FIG. 3, there are shown two multi-link logical entities on either side which includes multiple STAs that can set up links with each other. For infrastructure framework, a multi-link AP logical entity may include APs (e.g., AP1, AP2, and AP3) on one side, and multi-link non-AP logical entity, which may include non-APs (STA1, STA2, and STA3) on the other side. The detailed definition is shown below. Multi-link AP logical entity (AP MLLE also can be referred to as AP MLD): A multi-link logical entity, where each STA within the multi-link logical entity is an EHT AP. It should be noted that the term MLLE and MLD are interchangeable and indicate the same type of entity. Throughout this disclosure, MLLE may be used but any-where the MLLE term is used, it can be replaced with MLD. Multi-link non-AP logical entity (non-AP MLLE, also can be referred to as non-AP MLD): A multi-link logical entity, where each STA within the multi-link logical entity is a non-AP EHT STA. it should be noted that this framework is a natural extension from the one link operation between two STAs, which are AP and non-AP STA under the infrastruc-ture framework (e.g., when an AP is used as a medium for communication between STAs).

In the example of FIG. 3, the multi-link AP logical entity and multi-link non-AP logical entity may be two separate physical devices, where each one comprises a number of virtual or logical devices. For example, the multi-link AP logical entity may comprise three APs, AP1 operating on 2.4 GHz, AP2 operating on 5 GHz, and AP3 operating on 6 GHz. Further, the multi-link non-AP logical entity may comprise three non-AP STAs, STA1 communicating with AP1 on link 1, STA2 communicating with AP2 on link 2, and STA3 communicating with AP3 on link 3.

The multi-link AP logical entity is shown in FIG. 3 to have access to a distribution system (DS), which is a system used to interconnect a set of BSSs to create an extended service set (ESS). The multi-link AP logical entity is also shown in FIG. 3 to have access a distribution system medium (DSM), which is the medium used by a DS for BSS interconnections. Simply put, DS and DSM allow the AP to communicate with different BSSs.

It should be understood that although the example shows three logical entities within the multi-link AP logical entity and the three logical entities within the multi-link non-AP logical entity, this is merely for illustration purposes and that other numbers of logical entities with each of the multi-link AP and non-AP logical entities may be envisioned.

Figure 4:
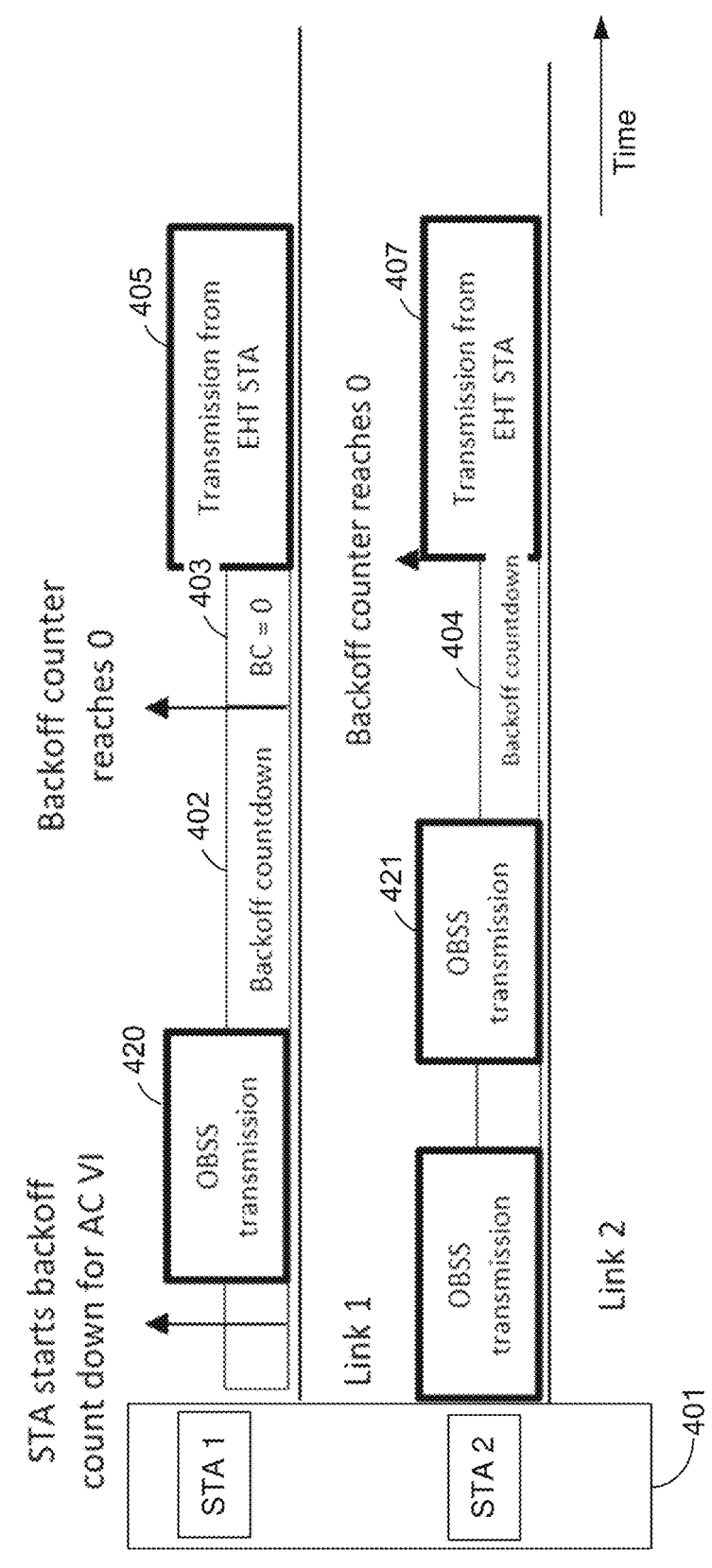
FIG. 4 depict illustrative schematic diagrams for aligned channel access, in accordance with one or more example embodiments of the present disclosure.

FIG. 4 depicts an illustrative schematic diagram for aligned channel access, in accordance with one or more example embodiments of the present disclosure.

According to the distributed coordination function (DCF), before transmitting a data frame, a station must sense the channel to determine whether any other station is transmit-ting. If the medium is found to be idle for an interval longer than the Distributed InterFrame Space (DIFS), the station continues with its transmission. On the other hand (i.e., if the medium is busy), the transmission is deferred until the end of the ongoing transmission. A random interval, referred to as the backoff time, is then selected, which is used to initialize the backoff timer. The backoff timer is decreased (backoff countdown) for as long as the channel is sensed as idle, stopped when a transmission is detected on the channel, and reactivated when the channel is sensed as idle again for more than a DIFS. The station is enabled to transmit its frame when the backoff timer reaches zero. The backoff time is slotted and it is specific to each station. Specifically, the backoff time is an integer number of slots uniformly chosen in the interval (0, CW−1). CW is defined as the Backoff Window, also referred to as Contention Window. At the first transmission attempt CW=CWmin, and it is doubled at each retransmission up to CWmax.

Referring to FIG. 4. Example of an EHT STA pausing its backoff counter at 0 so as to enable simultaneous transmis-sion on two links.

In one or more embodiments, a aligned channel access system may facilitate that after counting down to zero following regular EDCA backoff rules on a given link for an Access Category, a STA waits till it can simultaneously transmit on both links. Such opportunity arises when:

The backoff counter/timer value for the same or different access category (AC) in a different link reaches zero.

The STA on the other link is in the middle of an on-going TXOP and has the opportunity to transmit.

When an MAC service data unit (MSDU) arrives from an upper layer to the MAC layer of a device, the MSDU may first be mapped to one of four defined access categories (ACs) based at least in part on its user priority (UP). These four ACs include, in descending priority order, a voice (VO) access category, a video (VI) access category, a best effort (BE) access category, and a background (BK) access cat-egory. The MSDU is then routed to a transmit queue 212 corresponding to the AC to which the MSDU has been mapped. Each such transmit queue may have a correspond-ing EDCA function (EDCAF), which may define a backoff window size, an arbitration interframe space (AIFS), and a transmission opportunity (TXOP) length for all MSDUs in the corresponding AC. An internal collision resolution scheme may resolve conflicts between the EDCAFs of different queues, and may, for example, allow an MSDU from a higher-priority queue to access the channel and defer an MSDU from a lower-priority queue when the two queues have backoff timers expire at substantially the same time.

In one embodiment while the STA can pause its backoff counter at zero, it still waits for the channel to be idle for the arbitration inter-frame spacing (AIFS) time value for that AC before transmitting on that channel. AIFS in wireless LAN communications, is a method of prioritizing one AC over the other, such as giving voice or video priority over email. AIFS functions by shortening or expanding the period a wireless node has to wait before it is allowed to transmit its next frame. A shorter AIFS period means a message has a higher probability of being transmitted with low latency, which is particularly important for delay-critical data such as voice or streaming video.

Referring to FIG. 4, there is shown in MLD 401 that comprises two STAs (e.g., STA 1 and STA 2). Further there are two links associated with STA 1 and STA 2. For example STA 1 can transmit/receive on link 1 and STA 2 can transmit/receive on link 2. In this example, there is shown that on link one there is a transmission 420 and a backoff countdown 402 on link 1. The backoff countdown 402 reaches zero at time T1. However on link 2, STA 2 may have started a transmission 421 which is then followed by a backoff counter 404. In essence, the STA may still be performing its backoff countdown when the backoff count-down of STA 1 on link 1 has already reached zero. The STA 1 may then determine that STA 2 is still performing a backoff countdown 404. Based on the value of the remaining backoff countdown 404 when the backoff counter 402 reached zero, STA 1 may hold its backoff counter value at zero for a duration 403. That is, if remainder of the backoff countdown 404 is less than a threshold, STA 1 may hold its backoff counter value at zero for the duration 403. However if the remainder of the backoff countdown 404 is greater than a threshold, the STA 1 may not hold its backoff counter value at zero.

In one or more embodiments, STA1 and STA2 may synchronize their respective transmissions (e.g., transmission 405 and transmission 407) on multiple links within the MLD 401, such that STA 1 of the MLD 401 transmits in synchronization with STA 2 on separate links (e.g., link 1 and link 2). In that case, STA 1 may check the STA 2 transmission/reception status before starting its own transmission. As seen in FIG. 4, after the duration 403, STA 1 starts its transmission 405 on link 1 in synchronization with transmission 407 of STA 2 on link 2.

An alternative way to implement this is, after reaching backoff counter value of zero, a STA starts a new special backoff count-down using a smaller CW. Anytime while the STA is running this backoff counter the STA can transmit a packet at any time. Regular EDCA based channel access may resume at the end of the transmission.

A variant of this idea would be that after counting down to zero or any time after its backoff has been paused, the STA simply increases its backoff counter value to match that on the other link.

After pausing off its backoff count-down value at 0, a STA may modify its back-off counter value to be used for channel access in the next TXOP as follows:

In one embodiment the STA may use a shortened CW value to generate the next random backoff counter value.

In one embodiment the STA may use this shorter CW value after a successful transmission.

In one embodiment the STA may use this shorter CW value after an un-successful transmission.

In one embodiment the shorter CW value may be specified by the AP in a unicast or broadcast frame (e.g., Beacon frame) or specified in the 802.11 standard.

In one embodiment the shorter CW value may be equal to a joint function of the CW value to be used per regular EDCA rules and the amount of time or the number of idle slots the STA has spent while holding off its back off counter value at zero. For example:

Assume following a successful transmission of a packet, the CW value per regular EDCA rules is 15 while the STA has spent 8 additional idle slots holding off its backoff counter value at 0 before transmitting the packet. In this case, the STA may generate the next random backoff counter value using CW of 7 (e.g., 15–8).

Assume that following an unsuccessful transmission of a packet, the CW value per regular EDCA rules is 31 while the STA has spent at least 16 additional idle slots holding off its backoff counter value at 0 before transmitting the packet. In this case, the STA may generate the next random backoff counter value using CW of 15 (e.g., 31–16).

In one embodiment the duration for which a STA can hold off its backoff counter value at zero without any restriction for a specified period in the 802.11 standard.

In one embodiment the duration for which a STA can hold off its backoff counter value at zero without any restriction may be either implementation-specific or announced by the STA or fixed for the BSS. It could also be different for different ACs.

In one embodiment the duration for which a STA can hold off its backoff counter value at zero is a function of the current CW value. For example, if the STA has counted down to zero using a CW value of 15, then it may maximally wait for 15 idle slots after reaching the backoff counter of zero before either transmitting the packet or starting a new backoff count down using a new random value.

In one or more embodiments, it is possible that more internal collision events are created as while one of the ACs in a STA has counted down to zero and is holding off its backoff count at that value, another AC in the same STA has also counted down to zero.

In one embodiment the STA transmits packets from the oldest AC for which the backoff counter value of zero was reached.

In one embodiment the STA transmits packets from the highest priority AC that has a current backoff counter value of 0.

In one embodiment the STA may transmit packet from both ACs that has a current backoff counter value of 0.

In one embodiment the STA may just generate the random backoff counter for one of the ACs without doubling the contention window.

In one embodiment the AP to which the STA is associated may prevent it from holding off backoff counter at zero for a given period following one such instance. This period could be explicitly signaled to the STA in a unicast or broadcast frame or specified in the 802.11 standard and could be different for different ACs.

In one embodiment the other STAs in the same or neighboring BSS can disallow STA from holding the backoff counter at zero. This could be signaled in a beacon and valid for a given period or could be signaled in the preamble or MAC header of a frame or in a new frame.

In one embodiment this scheme can be used by any or a subset of Non-STR STAs in a BSS. In one embodiment this scheme can be used by STR STAs in a BSS. This scheme may be used in both uplink and downlink.

As an alternative way to make PIFS based channel access fairer, the following mechanism may be proposed: after PIFS based channel access on a link a STA does not perform another PIFS-based channel access for certain time duration.

In one embodiment the duration is a timer whose value is specified, potentially per-AC, by the associated AP similar to the MU-EDCA timer mechanism or is fixed to a particular value in the 802.11 standard or implementation-specific at the STA. This could be applied at the STA that used PIFs-based access or both STAs that simultaneously transmitted.

In one embodiment the duration is a new backoff countdown. The new backoff counter value could be a new randomly generated value (per EDCA rules) plus the remaining backoff timer value during PIFS-based access.

In one embodiment in case of collision the backoff counter at both STAs may be doubled.

It is understood that the above descriptions are for purposes of illustration and are not meant to be limiting.

FIG. 5 illustrates a flow diagram of illustrative process 500 for an aligned channel access system, in accordance with one or more example embodiments of the present disclosure.

At block 502, a device (e.g., the user device(s) 120 and/or the AP 102 of FIG. 1) may perform a first backoff countdown on a first link associated with a first station device (STA) of the device, wherein the device is a multi-link device (MLD). The first backoff countdown is held at zero for a first duration. The first duration is a duration that results in simultaneous transmissions on the first link and the second link.

At block 504, the device may detect a second backoff countdown associated with a second STA of the MLD after the first backoff countdown reaches zero.

At block 506, the device may determine to hold the first backoff countdown at zero based on the value of the second backoff countdown.

At block 508, the device may transmit in synchronization on the first link and on the second link from the first STA and the second STA respectively based on holding the first backoff countdown at zero. The device may compare a remainder of the second backoff countdown to a threshold value. The device may determine to hold the first backoff countdown at zero when the remainder of the second backoff countdown is less than the threshold value. The device may determine not to hold off the first backoff countdown at zero when the remainder of the second backoff countdown is greater than the threshold value. The device of claim 1, wherein the processing circuitry is further configured to determine an access category (AC) associated with transmissions on the first link and the second link.

It is understood that the above descriptions are for purposes of illustration and are not meant to be limiting.

FIG. 6 shows a functional diagram of an exemplary communication station 600, in accordance with one or more example embodiments of the present disclosure. In one embodiment, FIG. 6 illustrates a functional block diagram of a communication station that may be suitable for use as an AP(s) 102 (FIG. 1) or a user device(s) 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a aligned channel access device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 702 for generation and processing of the baseband signals and for controlling operations of the main memory 704, the storage device 716, and/or the aligned channel access device 719. The baseband processor may be provided on a single radio card, a single chip, or an integrated circuit (IC).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The aligned channel access device 719 may carry out or perform any of the operations and processes (e.g., process 500) described and shown above.

It is understood that the above are only a subset of what the aligned channel access device 719 may be configured to perform and that other functions included throughout this disclosure may also be performed by the aligned channel access device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 8:
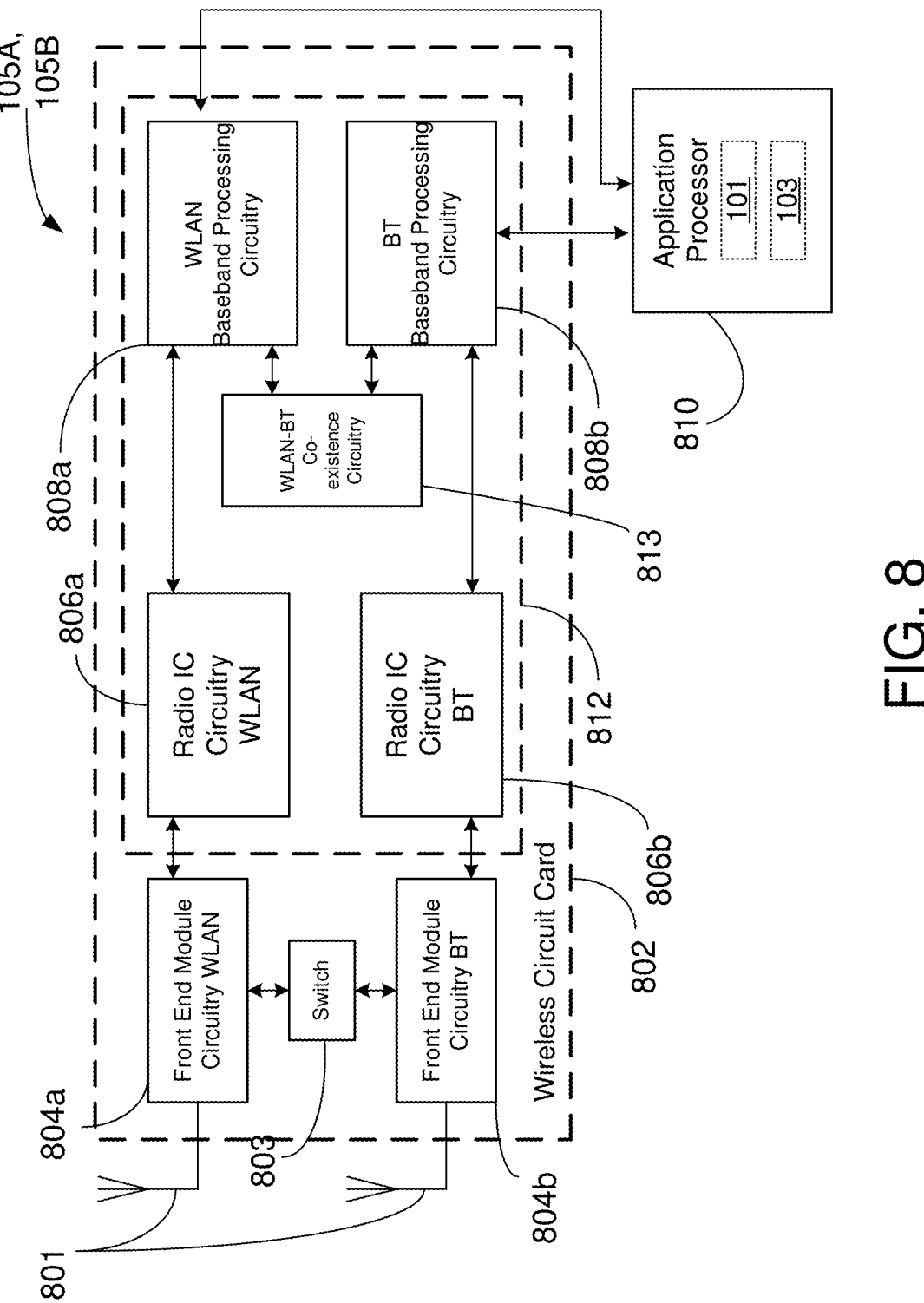
FIG. 8 is a block diagram of a radio architecture in accordance with some examples.

FIG. 8 is a block diagram of a radio architecture 105A, 105B in accordance with some embodiments that may be implemented in any one of the example AP(s) 102 and/or the example user device(s) 120 of FIG. 1. Radio architecture 105A, 105B may include radio front-end module (FEM) circuitry 804a-b, radio IC circuitry 806a-b and baseband processing circuitry 808a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 804a-b may include a WLAN or Wi-Fi FEM circuitry 804a and a Bluetooth (BT) FEM circuitry 804b. The WLAN FEM circuitry 804a may include a receive signal path comprising circuitry configured to operate on WLAN RF signals received from one or more antennas 801, to amplify the received signals and to provide the amplified versions of the received signals to the WLAN radio IC circuitry 806a for further processing. The BT FEM circuitry 804b may include a receive signal path which may include circuitry configured to operate on BT RF signals received from one or more antennas 801, to amplify the received signals and to provide the amplified versions of the received signals to the BT radio IC circuitry 806b for further processing. FEM circuitry 804a may also include a transmit signal path which may include circuitry configured to amplify WLAN signals provided by the radio IC circuitry 806a for wireless transmission by one or more of the antennas 801. In addition, FEM circuitry 804b may also include a transmit signal path which may include circuitry configured to amplify BT signals provided by the radio IC circuitry 806b for wireless transmission by the one or more antennas 801. In the embodiment of FIG. 8, although FEM 804a and FEM 804b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 806a-b as shown may include WLAN radio IC circuitry 806a and BT radio IC circuitry 806b. The WLAN radio IC circuitry 806a may include a receive signal path which may include circuitry to down-convert WLAN RF signals received from the FEM circuitry 804a and provide baseband signals to WLAN baseband processing circuitry 808a. BT radio IC circuitry 806b may in turn include a receive signal path which may include circuitry to down-convert BT RF signals received from the FEM circuitry 804b and provide baseband signals to BT baseband processing circuitry 808b. WLAN radio IC circuitry 806a may also include a transmit signal path which may include circuitry to up-convert WLAN baseband signals provided by the WLAN baseband processing circuitry 808a and provide WLAN RF output signals to the FEM circuitry 804a for subsequent wireless transmission by the one or more antennas 801. BT radio IC circuitry 806b may also include a transmit signal path which may include circuitry to up-convert BT baseband signals provided by the BT baseband processing circuitry 808b and provide BT RF output signals to the FEM circuitry 804b for subsequent wireless transmission by the one or more antennas 801. In the embodiment of FIG. 8, although radio IC circuitries 806a and 806b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 808a-b may include a WLAN baseband processing circuitry 808a and a BT baseband processing circuitry 808b. The WLAN baseband processing circuitry 808a may include a memory, such as, for example, a set of RAM arrays in a Fast Fourier Transform or Inverse Fast Fourier Transform block (not shown) of the WLAN baseband processing circuitry 808a. Each of the WLAN baseband circuitry 808a and the BT baseband circuitry 808b may further include one or more processors and control logic to process the signals received from the corresponding WLAN or BT receive signal path of the radio IC circuitry 806a-b, and to also generate corresponding WLAN or BT baseband signals for the transmit signal path of the radio IC circuitry 806a-b. Each of the baseband processing circuitries 808a and 808b may further include physical layer (PHY) and medium access control layer (MAC) circuitry, and may further interface with a device for generation and processing of the baseband signals and for controlling operations of the radio IC circuitry 806a-b.

Referring still to FIG. 8, according to the shown embodiment, WLAN-BT coexistence circuitry 813 may include logic providing an interface between the WLAN baseband circuitry 808a and the BT baseband circuitry 808b to enable use cases requiring WLAN and BT coexistence. In addition, a switch 803 may be provided between the WLAN FEM circuitry 804a and the BT FEM circuitry 804b to allow switching between the WLAN and BT radios according to application needs. In addition, although the antennas 801 are depicted as being respectively connected to the WLAN FEM circuitry 804a and the BT FEM circuitry 804b, embodiments include within their scope the sharing of one or more antennas as between the WLAN and BT FEMs, or the provision of more than one antenna connected to each of FEM 804a or 804b.

In some embodiments, the front-end module circuitry 804a-b, the radio IC circuitry 806a-b, and baseband processing circuitry 808a-b may be provided on a single radio card, such as wireless radio card 802. In some other embodiments, the one or more antennas 801, the FEM circuitry 804a-b and the radio IC circuitry 806a-b may be provided on a single radio card. In some other embodiments, the radio IC circuitry 806a-b and the baseband processing circuitry 808a-b may be provided on a single chip or integrated circuit (IC), such as IC 812.

In some embodiments, the wireless radio card 802 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 808b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5 GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 9:
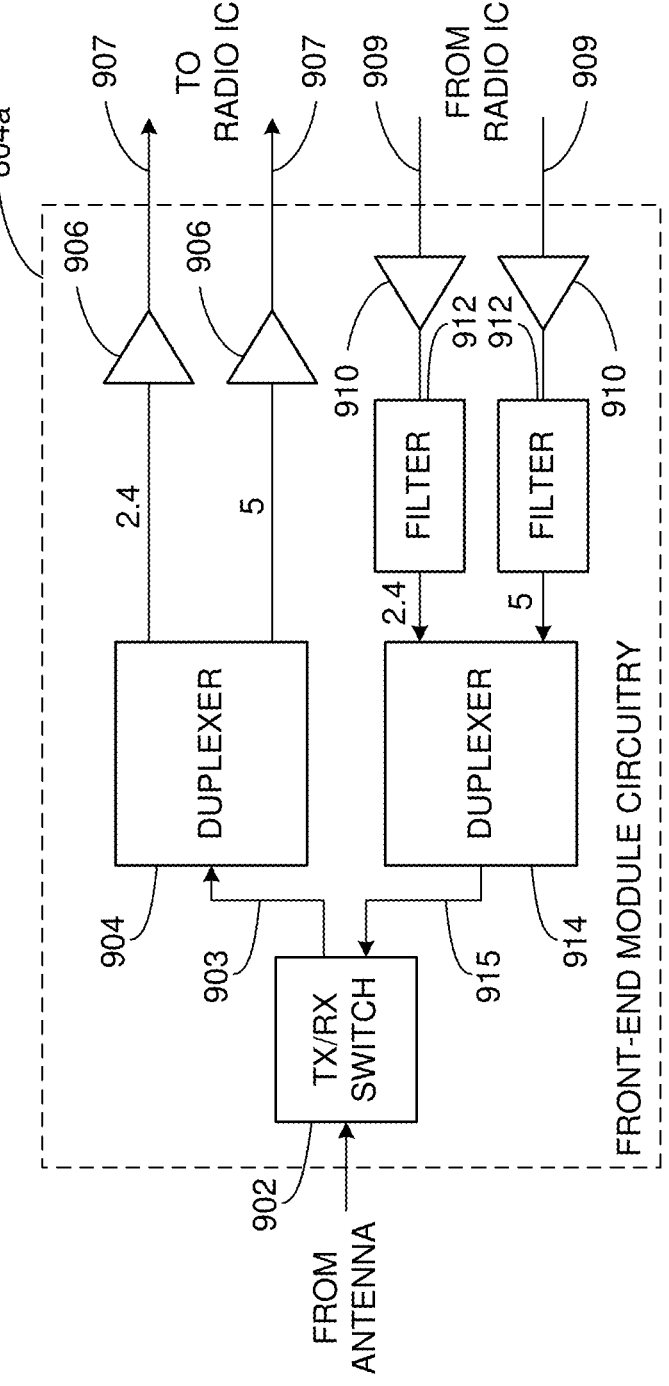
FIG. 9 illustrates an example front-end module circuitry for use in the radio architecture of FIG. 8, in accordance with one or more example embodiments of the present disclosure.

FIG. 9 illustrates WLAN FEM circuitry 804a in accordance with some embodiments. Although the example of FIG. 9 is described in conjunction with the WLAN FEM circuitry 804a, the example of FIG. 9 may be described in conjunction with the example BT FEM circuitry 804b (FIG. 8), although other circuitry configurations may also be suitable.

In some embodiments, the FEM circuitry 804a may include a TX/RX switch 902 to switch between transmit mode and receive mode operation. The FEM circuitry 804a may include a receive signal path and a transmit signal path.

The receive signal path of the FEM circuitry 804a may include a low-noise amplifier (LNA) 906 to amplify received RF signals 903 and provide the amplified received RF signals 907 as an output (e.g., to the radio IC circuitry 806a-b (FIG. 8)). The transmit signal path of the circuitry 804a may include a power amplifier (PA) to amplify input RF signals 909 (e.g., provided by the radio IC circuitry 806a-b), and one or more filters 912, such as band-pass filters (BPFs), low-pass filters (LPFs) or other types of filters, to generate RF signals 915 for subsequent transmission (e.g., by one or more of the antennas 801 (FIG. 8)) via an example duplexer 914.

In some dual-mode embodiments for Wi-Fi communication, the FEM circuitry 804a may be configured to operate in either the 2.4 GHz frequency spectrum or the 5 GHz frequency spectrum. In these embodiments, the receive signal path of the FEM circuitry 804a may include a receive signal path duplexer 904 to separate the signals from each spectrum as well as provide a separate LNA 906 for each spectrum as shown. In these embodiments, the transmit signal path of the FEM circuitry 804a may also include a power amplifier 910 and a filter 912, such as a BPF, an LPF or another type of filter for each frequency spectrum and a transmit signal path duplexer 904 to provide the signals of one of the different spectrums onto a single transmit path for subsequent transmission by the one or more of the antennas 801 (FIG. 8). In some embodiments, BT communications may utilize the 2.4 GHz signal paths and may utilize the same FEM circuitry 804a as the one used for WLAN communications.

Figure 10:
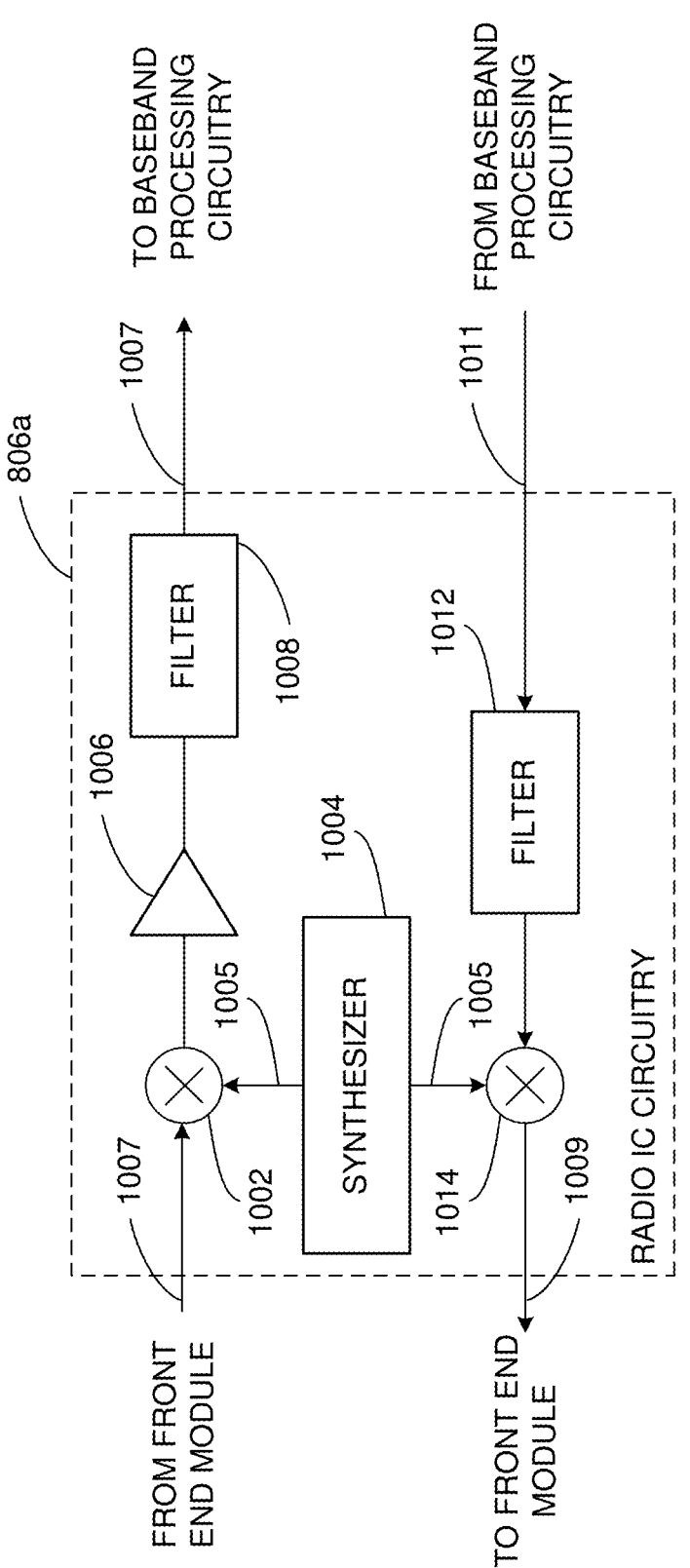
FIG. 10 illustrates an example radio IC circuitry for use in the radio architecture of FIG. 8, in accordance with one or more example embodiments of the present disclosure.

FIG. 10 illustrates radio IC circuitry 806a in accordance with some embodiments. The radio IC circuitry 806a is one example of circuitry that may be suitable for use as the WLAN or BT radio IC circuitry 806a/806b (FIG. 8), although other circuitry configurations may also be suitable. Alternatively, the example of FIG. 10 may be described in conjunction with the example BT radio IC circuitry 806b.

In some embodiments, the radio IC circuitry 806a may include a receive signal path and a transmit signal path. The receive signal path of the radio IC circuitry 806a may include at least mixer circuitry 1002, such as, for example, down-conversion mixer circuitry, amplifier circuitry 1006 and filter circuitry 1008. The transmit signal path of the radio IC circuitry 806a may include at least filter circuitry 1012 and mixer circuitry 1014, such as, for example, up-conversion mixer circuitry. Radio IC circuitry 806a may also include synthesizer circuitry 1004 for synthesizing a frequency 1005 for use by the mixer circuitry 1002 and the mixer circuitry 1014. The mixer circuitry 1002 and/or 1014 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 10 illustrates only a simplified version of a radio IC circuitry, and may include, although not shown, embodiments where each of the depicted circuitries may include more than one component. For instance, mixer circuitry 1014 may each include one or more mixers, and filter circuitries 1008 and/or 1012 may each include one or more filters, such as one or more BPFs and/or LPFs according to application needs. For example, when mixer circuitries are of the direct-conversion type, they may each include two or more mixers.

In some embodiments, mixer circuitry 1002 may be configured to down-convert RF signals 907 received from the FEM circuitry 804a-b (FIG. 8) based on the synthesized frequency 1005 provided by synthesizer circuitry 1004. The amplifier circuitry 1006 may be configured to amplify the down-converted signals and the filter circuitry 1008 may include an LPF configured to remove unwanted signals from the down-converted signals to generate output baseband signals 1007. Output baseband signals 1007 may be provided to the baseband processing circuitry 808a-b (FIG. 8) for further processing. In some embodiments, the output baseband signals 1007 may be zero-frequency baseband signals, although this is not a requirement. In some embodiments, mixer circuitry 1002 may comprise passive mixers, although the scope of the embodiments is not limited in this respect.

In some embodiments, the mixer circuitry 1014 may be configured to up-convert input baseband signals 1011 based on the synthesized frequency 1005 provided by the synthesizer circuitry 1004 to generate RF output signals 909 for the FEM circuitry 804a-b. The baseband signals 1011 may be provided by the baseband processing circuitry 808a-b and may be filtered by filter circuitry 1012. The filter circuitry 1012 may include an LPF or a BPF, although the scope of the embodiments is not limited in this respect.

In some embodiments, the mixer circuitry 1002 and the mixer circuitry 1014 may each include two or more mixers and may be arranged for quadrature down-conversion and/or up-conversion respectively with the help of synthesizer 1004. In some embodiments, the mixer circuitry 1002 and the mixer circuitry 1014 may each include two or more mixers each configured for image rejection (e.g., Hartley image rejection). In some embodiments, the mixer circuitry 1002 and the mixer circuitry 1014 may be arranged for direct down-conversion and/or direct up-conversion, respectively. In some embodiments, the mixer circuitry 1002 and the mixer circuitry 1014 may be configured for super-heterodyne operation, although this is not a requirement.

Mixer circuitry 1002 may comprise, according to one embodiment: quadrature passive mixers (e.g., for the in-phase (I) and quadrature phase (Q) paths). In such an embodiment, RF input signal 907 from FIG. 10 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1005 of synthesizer 1004 (FIG. 10). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 907 (FIG. 9) may comprise a balanced signal, although the scope of the embodiments is not limited in this respect. The I and Q baseband output signals may be provided to low-noise amplifier, such as amplifier circuitry 1006 (FIG. 10) or to filter circuitry 1008 (FIG. 10).

In some embodiments, the output baseband signals 1007 and the input baseband signals 1011 may be analog baseband signals, although the scope of the embodiments is not limited in this respect. In some alternate embodiments, the output baseband signals 1007 and the input baseband signals 1011 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1004 may be a fractional-N synthesizer or a fractional N/N+1 synthesizer, although the scope of the embodiments is not limited in this respect as other types of frequency synthesizers may be suitable. For example, synthesizer circuitry 1004 may be a delta-sigma synthesizer, a frequency multiplier, or a synthesizer comprising a phase-locked loop with a frequency divider. According to some embodiments, the synthesizer circuitry 1004 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1004 may be provided by a voltage controlled oscillator (VCO), although that is not a requirement. A divider control input may further be provided by either the baseband processing circuitry 808a-b (FIG. 8) depending on the desired output frequency 1005. In some embodiments, a divider control input (e.g., N) may be determined from a look-up table (e.g., within a Wi-Fi card) based on a channel number and a channel center frequency as determined or indicated by the example application processor 810. The application processor 810 may include, or otherwise be connected to, one of the example secure signal converter 101 or the example received signal converter 103 (e.g., depending on which device the example radio architecture is implemented in).

In some embodiments, synthesizer circuitry 1004 may be configured to generate a carrier frequency as the output frequency 1005, while in other embodiments, the output frequency 1005 may be a fraction of the carrier frequency (e.g., one-half the carrier frequency, one-third the carrier frequency). In some embodiments, the output frequency 1005 may be a LO frequency (fLO).

Figure 11:
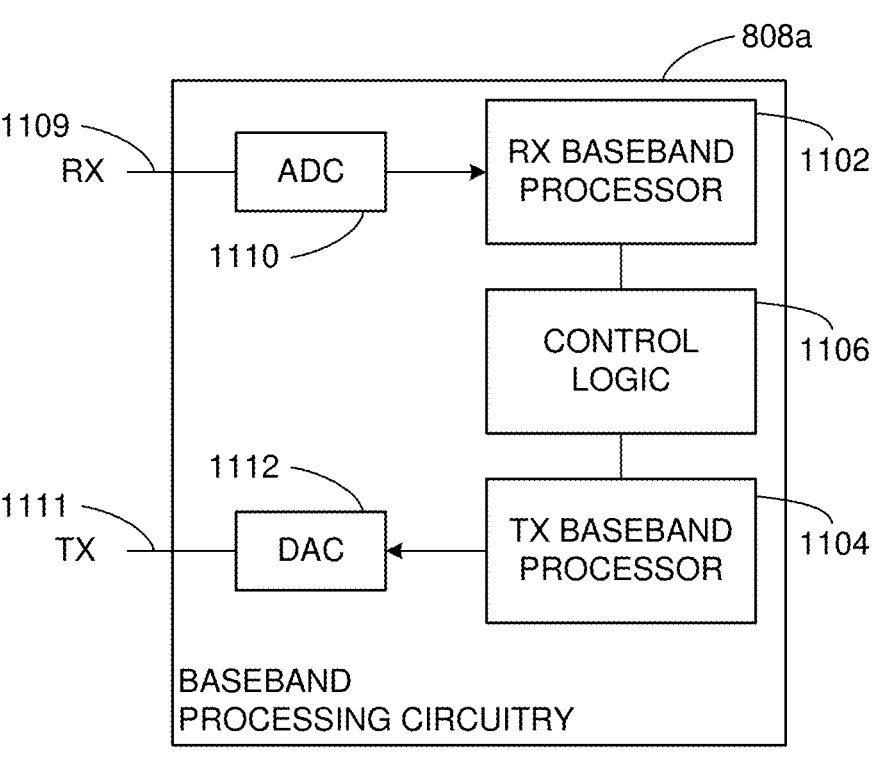
FIG. 11 illustrates an example baseband processing circuitry for use in the radio architecture of FIG. 8, in accordance with one or more example embodiments of the present disclosure.

FIG. 11 illustrates a functional block diagram of baseband processing circuitry 808a in accordance with some embodiments. The baseband processing circuitry 808a is one example of circuitry that may be suitable for use as the baseband processing circuitry 808a (FIG. 8), although other circuitry configurations may also be suitable. Alternatively, the example of FIG. 10 may be used to implement the example BT baseband processing circuitry 808b of FIG. 8.

The baseband processing circuitry 808a may include a receive baseband processor (RX BBP) 1102 for processing receive baseband signals 1009 provided by the radio IC circuitry 806a-b (FIG. 8) and a transmit baseband processor (TX BBP) 1104 for generating transmit baseband signals 1011 for the radio IC circuitry 806a-b. The baseband processing circuitry 808a may also include control logic 1106 for coordinating the operations of the baseband processing circuitry 808a.

In some embodiments (e.g., when analog baseband signals are exchanged between the baseband processing circuitry 808a-b and the radio IC circuitry 806a-b), the baseband processing circuitry 808a may include ADC 1110 to convert analog baseband signals 1109 received from the radio IC circuitry 806a-b to digital baseband signals for processing by the RX BBP 1102. In these embodiments, the baseband processing circuitry 808a may also include DAC 1112 to convert digital baseband signals from the TX BBP 1104 to analog baseband signals 1111.

In some embodiments that communicate OFDM signals or OFDMA signals, such as through baseband processor 808a, the transmit baseband processor 1104 may be configured to generate OFDM or OFDMA signals as appropriate for transmission by performing an inverse fast Fourier transform (IFFT). The receive baseband processor 1102 may be configured to process received OFDM signals or OFDMA signals by performing an FFT. In some embodiments, the receive baseband processor 1102 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 8, in some embodiments, the antennas 801 (FIG. 8) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 801 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: perform a first backoff countdown on a first link associated with a first station device (STA) of the device, wherein the device may be an multi-link device (MLD); detect a second backoff countdown associated with a second STA of the MLD after the first backoff countdown reaches zero; determine to hold the first backoff countdown at zero based on the value of the second backoff countdown; and transmit in synchronization on the first link and on the second link from the first STA and the second STA respectively based on holding the first backoff countdown at zero.

Example 2 may include the device of example 1 and/or some other example herein, wherein the processing circuitry may be further configured to compare a remainder of the second backoff countdown to a threshold value.

Example 3 may include the device of example 2 and/or some other example herein, wherein the processing circuitry may be further configured to determine to hold the first backoff countdown at zero when the remainder of the second backoff countdown may be less than the threshold value.

Example 4 may include the device of example 2 and/or some other example herein, wherein the processing circuitry may be further configured to determine not to hold off the first backoff countdown at zero when the remainder of the second backoff countdown may be greater than the threshold value.

Example 5 may include the device of example 1 and/or some other example herein, wherein the first backoff countdown may be held at zero for a first duration.

Example 6 may include the device of example 5 and/or some other example herein, wherein the first duration may be a duration that results in simultaneous transmissions on the first link and the second link.

Example 7 may include the device of example 1 and/or some other example herein, wherein the processing circuitry may be further configured to determine an access category (AC) associated with transmissions on the first link and the second link.

Example 8 may include the device of example 1 and/or some other example herein, further comprising a transceiver configured to transmit and receive wireless signals.

Example 9 may include the device of example 8 and/or some other example herein, further comprising an antenna coupled to the transceiver to cause to send a frame.

Example 10 may include a non-transitory computer-readable medium storing computer-executable instructions which when executed by one or more processors of a device result in performing operations comprising: performing a first backoff countdown on a first link associated with a first station device (STA) of the device, wherein the device may be an multi-link device (MLD); detecting a second backoff countdown associated with a second STA of the MLD after the first backoff countdown reaches zero; determining to hold the first backoff countdown at zero based on the value of the second backoff countdown; and transmitting in synchronization on the first link and on the second link from the first STA and the second STA respectively based on holding the first backoff countdown at zero.

Example 11 may include the non-transitory computer-readable medium of example 10 and/or some other example herein, wherein the operations further comprise comparing a remainder of the second backoff countdown to a threshold value.

Example 12 may include the non-transitory computer-readable medium of example 11 and/or some other example herein, wherein the operations further comprise determining to hold the first backoff countdown at zero when the remainder of the second backoff countdown may be less than the threshold value.

Example 13 may include the non-transitory computer-readable medium of example 11 and/or some other example herein, wherein the operations further comprise determining not to hold off the first backoff countdown at zero when the remainder of the second backoff countdown may be greater than the threshold value.

Example 14 may include the non-transitory computer-readable medium of example 10 and/or some other example herein, wherein the first backoff countdown may be held at zero for a first duration.

Example 15 may include the non-transitory computer-readable medium of example 14 and/or some other example herein, wherein the first duration may be a duration that results in simultaneous transmissions on the first link and the second link.

Example 16 may include the non-transitory computer-readable medium of example 10 and/or some other example herein, wherein the operations further comprise determining an access category (AC) associated with transmissions on the first link and the second link.

Example 17 may include a method comprising: performing, by one or more processors of a device, a first backoff countdown on a first link associated with a first station device (STA) of the device, wherein the device may be an multi-link device (MLD); detecting a second backoff countdown associated with a second STA of the MLD after the first backoff countdown reaches zero; determining to hold the first backoff countdown at zero based on the value of the second backoff countdown; and transmitting in synchronization on the first link and on the second link from the first STA and the second STA respectively based on holding the first backoff countdown at zero.

Example 18 may include the method of example 17 and/or some other example herein, further comprising comparing a remainder of the second backoff countdown to a threshold value.

Example 19 may include the method of example 18 and/or some other example herein, further comprising determining to hold the first backoff countdown at zero when the remainder of the second backoff countdown may be less than the threshold value.

Example 20 may include the method of example 18 and/or some other example herein, further comprising determining not to hold off the first backoff countdown at zero when the remainder of the second backoff countdown may be greater than the threshold value.

Example 21 may include the method of example 17 and/or some other example herein, wherein the first backoff countdown may be held at zero for a first duration.

Example 22 may include the method of example 21 and/or some other example herein, wherein the first duration may be a duration that results in simultaneous transmissions on the first link and the second link.

Example 23 may include the method of example 17 and/or some other example herein, further comprising determining an access category (AC) associated with transmissions on the first link and the second link.

Example 24 may include an apparatus comprising means for: performing a first backoff countdown on a first link associated with a first station device (STA) of a device associated with apparatus, wherein the device may be an multi-link device (MLD); detecting a second backoff countdown associated with a second STA of the MLD after the first backoff countdown reaches zero; determining to hold the first backoff countdown at zero based on the value of the second backoff countdown; and transmitting in synchronization on the first link and on the second link from the first STA and the second STA respectively based on holding the first backoff countdown at zero.

Example 25 may include the apparatus of example 24 and/or some other example herein, further comprising comparing a remainder of the second backoff countdown to a threshold value.

Example 26 may include the apparatus of example 25 and/or some other example herein, further comprising determining to hold the first backoff countdown at zero when the remainder of the second backoff countdown may be less than the threshold value.

Example 27 may include the apparatus of example 25 and/or some other example herein, further comprising determining not to hold off the first backoff countdown at zero when the remainder of the second backoff countdown may be greater than the threshold value.

Example 28 may include the apparatus of example 24 and/or some other example herein, wherein the first backoff countdown may be held at zero for a first duration.

Example 29 may include the apparatus of example 28 and/or some other example herein, wherein the first duration may be a duration that results in simultaneous transmissions on the first link and the second link.

Example 30 may include the apparatus of example 24 and/or some other example herein, further comprising determining an access category (AC) associated with transmissions on the first link and the second link. Example 31 may include one or more non-transitory computer-readable media comprising instructions to cause an electronic device, upon execution of the instructions by one or more processors of the electronic device, to perform one or more elements of a method described in or related to any of examples 1-30, or any other method or process described herein.

Example 32 may include an apparatus comprising logic, modules, and/or circuitry to perform one or more elements of a method described in or related to any of examples 1-30, or any other method or process described herein.

Example 33 may include a method, technique, or process as described in or related to any of examples 1-30, or portions or parts thereof.

Example 34 may include an apparatus comprising: one or more processors and one or more computer readable media comprising instructions that, when executed by the one or more processors, cause the one or more processors to perform the method, techniques, or process as described in or related to any of examples 1-30, or portions thereof.

Example 35 may include a method of communicating in a wireless network as shown and described herein.

Example 36 may include a system for providing wireless communication as shown and described herein.

Example 37 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An apparatus for a multi-link device (MLD), the apparatus comprising processing circuitry coupled to storage, the processing circuitry configured to:

manage transmissions over multiple wireless links within the MLD, wherein the MLD comprises a first station device (STA) and a second STA, each associated with distinct wireless links within the MLD;

perform a first backoff countdown on a first link associated with the first STA;

perform a second backoff countdown on a second link associated with the second STA;

synchronize transmission opportunities across the first link and the second link based on a status of the first backoff countdown and the second backoff countdown, wherein the synchronization includes pausing the backoff counter at zero, and resuming transmission on the first link independently if the second backoff countdown does not reach zero within a defined synchronization window;

generate, following a transmission on the first link, a subsequent backoff counter value for the first link using a shortened contention window (CW) value calculated by subtracting a number of idle slots the first STA spent holding the first backoff countdown at zero; and perform synchronized transmissions on the first link and the second link.

2. The apparatus of claim 1, wherein the first backoff countdown and the second backoff countdown adhere to Enhanced Distributed Channel Access (EDCA) rules for specified Access Categories (AC).

3. The apparatus of claim 1, wherein the processing circuitry is further configured to monitor multiple backoff countdowns associated with different STAs within the MLD.

4. The apparatus of claim 1, wherein the synchronized transmissions include maintaining a backoff countdown at zero to enable simultaneous transmission opportunities.

5. The apparatus of claim 1, wherein the processing circuitry is further configured to enable synchronized transmission on multiple links upon alignment of the backoff countdowns of corresponding STAs.

6. The apparatus of claim 1, wherein the processing circuitry is further configured to determine to hold the first backoff countdown at zero when a remainder of the second backoff countdown is not zero.

7. The apparatus of claim 1, wherein the first backoff countdown is held at zero for a first duration.

8. The apparatus of claim 7, wherein the first duration is a duration that results in simultaneous transmissions on the first link and the second link.

9. The apparatus of claim 1, further comprising a transceiver configured to transmit and receive wireless signals.

10. The apparatus of claim 9, further comprising an antenna coupled to the transceiver to cause to send the transmissions.

11. A non-transitory computer-readable medium storing computer-executable instructions which when executed by one or more processors of a multi-link device (MLD) result in performing operations comprising:

managing transmissions over multiple wireless links within the MLD, wherein the MLD comprises a first station device (STA) and a second STA, each associated with distinct wireless links within the MLD;

performing a first backoff countdown on a first link associated with the first STA;

performing a second backoff countdown on a second link associated with the second STA;

synchronizing transmission opportunities across the first link and the second link based on a status of the first backoff countdown and the second backoff countdown, wherein the synchronization includes pausing the backoff counter at zero, and resuming transmission on the first link independently if the second backoff countdown does not reach zero within a defined synchronization window;

generating, following a transmission on the first link, a subsequent backoff counter value for the first link using a shortened contention window (CW) value calculated by subtracting a number of idle slots the first STA spent holding the first backoff countdown at zero; and performing synchronized transmissions on the first link and the second link.

12. The non-transitory computer-readable medium of claim 11, wherein the first backoff countdown and the second backoff countdown adhere to Enhanced Distributed Channel Access (EDCA) rules for specified Access Categories (AC).

13. The non-transitory computer-readable medium of claim 11, wherein the operations further comprise monitoring multiple backoff countdowns associated with different STAs within the MLD.

14. The non-transitory computer-readable medium of claim 11, wherein the synchronized transmissions include maintaining a backoff countdown at zero to enable simultaneous transmission opportunities.

15. The non-transitory computer-readable medium of claim 11, wherein the operations further comprise enabling synchronized transmission on multiple links upon alignment of the backoff countdowns of corresponding STAs.

16. The non-transitory computer-readable medium of claim 12, wherein the operations further comprise determining to hold the first backoff countdown at zero when a remainder of the second backoff countdown is not zero.

17. The non-transitory computer-readable medium of claim 11, wherein the first backoff countdown is held at zero for a first duration.

18. The non-transitory computer-readable medium of claim 17, wherein the first duration is a duration that results in simultaneous transmissions on the first link and the second link.

19. A method comprising:

managing, by one or more processors of a multi-link device (MLD), transmissions over multiple wireless links within the MLD, wherein the MLD comprises a first station device (STA) and a second STA, each associated with distinct wireless links within the MLD;

performing a first backoff countdown on a first link associated with the first STA;

performing a second backoff countdown on a second link associated with the second STA;

synchronizing transmission opportunities across the first link and the second link based on a status of the first backoff countdown and the second backoff countdown, wherein the synchronization includes pausing the backoff counter at zero, and resuming transmission on the first link independently if the second backoff countdown does not reach zero within a defined synchronization window; and generating, following a transmission on the first link, a subsequent backoff counter value for the first link using a shortened contention window (CW) value calculated by subtracting a number of idle slots the first STA spent holding the first backoff countdown at zero; and performing synchronized transmissions on the first link and the second link.

20. The method of claim 19, wherein the first backoff countdown and the second backoff countdown adhere to Enhanced Distributed Channel Access (EDCA) rules for specified Access Categories (AC).

* * * * *